3,150,964
PURIFICATION OF YTTRIUM METAL
Oscar Norman Carlson, Frederick A. Schmidt, and Joseph A. Haefling, Ames, Iowa, assignors to the United States of America as represented by the United States Atomic Energy Commission
No Drawing. Filed Aug. 9, 1963, Ser. No. 301,212
9 Claims. (Cl. 75—84)

This invention deals with a process of purifying yttrium metal.

Yttrium metal that has been produced by the reduction of yttrium fluoride is usually contaminated by oxygen and fluorine, two types of impurities that are utterly undesirable, because they impair the physical properties of the metal and in particular account for a high brittleness of the metal.

Yttrium metal is used, for instance, as construction material in nuclear reactors and especially for parts of reactors that come in contact with liquid plutonium alloys.

It is an object of this invention to provide a process for the purification of yttrium metal that does not require operation in aqueous solutions and that is simple and inexpensive.

It was found that yttrium metal is chlorinated and forms yttrium chloride when contacted with molten magnesium chloride. It was also found that yttrium chloride can be reduced by calcium metal and that the calcium chloride formed does not reverse the reaction. Thus, the inventors discovered the unexpected and rather inconsistent behavior of magnesium chloride and calcium chloride, one being a chlorinating agent for yttrium, the other one not so reacting with it. This behavior could not be deduced from or be suggested by thermodynamic data at present available. It was finally also found that yttrium chloride has a high affinity to oxygen- and fluorine-containing impurities present in yttrium metal and extracts such impurities to a high degree. The process of this invention is based on these findings.

The process of this invention comprises dissolving crude yttrium metal containing oxygen and fluorine and possibly other impurities in molten magnesium chloride, whereby yttrium chloride and magnesium are formed; providing in the molten mass obtained a content of crude yttrium metal to be purified, whereby impurities of yttrium metal are extracted into the yttrium chloride formed and purified yttrium is obtained and alloyed with said magnesium; separating the yttrium chloride from the yttrium-magnesium alloy; and heating the yttrium-magnesium alloy, whereby magnesium is volatilized and purified yttrium is obtained.

The magnesium chloride should be anhydrous magnesium chloride. The dissolution-chlorination step is advantageously carried out in an inert atmosphere, for instance of argon, preferably at superatmospheric pressure. The temperature, of course, should be above the melting point of magnesium chloride and also of yttrium chloride and preferably ranges between 950 and 1000° C.

Crude yttrium to be purified may then be added to the melt. However, in order not to have to interrupt the operation for this purpose, it is preferred that an excess of yttrium scrap be used in the beginning or, in other words, a deficiency of magnesium chloride. By this, only a portion of the yttrium is chlorinated, and the other, remaining, portion is then purified by the extraction effect of the yttrium chloride formed. Both alternative steps, that of adding a new yttrium portion after chlorination and that of starting out with an excess amount of yttrium scrap, are to be covered by the generic term "providing a content of yttrium metal." The mass is advantageously agitated during the dissolution-chlorination step; the reaction proceeds relatively fast and is usually complete after 30 minutes.

The yttrium chloride can then be separated from the yttrium-magnesium alloy by decantation or other known means, and the alloy can then be subjected to a distillation step for the removal of magnesium from the yttrium.

If, however, all of the yttrium present is completely chlorinated first by using stoichiometric amounts of magnesium chloride, the reaction mass obtained contains yttrium chloride plus impurities and magnesium metal formed. In this case the impurities can be separated by subjecting the molten mass to a vacuum distillation at between 950 and 1000° C. whereby the yttrium chloride and magnesium volatilize, leaving the impurities as a residue. The yttrium chloride and magnesium vapors are condensed, and the yttrium chloride is then reduced, for instance, with calcium metal. As mentioned before, this reaction is not reversed by substantial amounts of calcium chloride. A metal layer of yttrium-magnesium or yttrium-magnesium-calcium alloy is then separated from the calcium chloride formed, and the magnesium and any calcium are removed from the yttrium by vacuum distillation.

If, for the reduction step, calcium is added in amounts less than that necessary for the complete reduction of all yttrium chloride, which means if some yttrium chloride is retained in the reaction vessel, another second purification extraction is accomplished by this remainder of yttrium chloride. In this case a mixture of yttrium-magnesium alloy and calcium chloride-yttrium chloride melt is obtained; the salt melt contains the impurities. This alloy is separated from the calcium chloride-yttrium chloride by customary means, for instance by decantation. The magnesium can then be removed from the yttrium by vacuum distillation of the alloy. This, however, is not part of the invention. The yttrium is obtained in the form of a sponge material in the process of this invention. The sponge can then be arc-melted and formed into solid bodies of the shape desired, depending on the intended use.

The yttrium chloride can also be recycled into the process for extraction of impurities from new batches of yttrium scrap. When the yttrium chloride is almost saturated with impurities, it is purified by vacuum distillation before re-use.

Tantalum or titanium crucibles equipped with a tantalum stirrer were found suitable for carrying out the process of this invention. The crucibles are provided with a closure that allows hermetic sealing of the crucibles, with inlets for introduction of the inert gas and with outlets for connection with a vacuum pump. The crucibles also have an outlet pipe for the removal of the volatilized substances during evacuation.

In the following, three examples are given to illustrate the process of this invention.

EXAMPLE I

In this example yttrium was purified by converting a portion thereof to the chloride with magnesium chloride and using the yttrium chloride formed for extraction of the excess, nonchlorinated, yttrium metal.

For this purpose, 903 grams of yttrium metal, containing contaminants in the proportions shown in Table I below, were mixed with 625 grams of anhydrous magnesium chloride. The mixture was heated at 975° C. in a titanium crucible surrounded by an atmosphere of argon at a pressure of 5 p.s.i. Stirring was carried out for 30 minutes, whereupon the yttrium-magnesium alloy formed was decanted from the remaining yttrium chloride. The product was then found to consist of 656 grams of yttrium-magnesium alloy (24 w/o of magnesium) and 862 grams of yttrium chloride.

The yttrium-magnesium alloy was vacuum-heated at 950° C. for 24 hours to volatilize the magnesium. The remaining yttrium sponge was then arc-melted and formed into a button. This yttrium button was analyzed. The compositions of the crude yttrium and that purified by the process of this invention are compared in Table I.

Table I

| Impurity | Crude Yttrium, p.p.m. | Yttrium Product, p.p.m. |
|---|---|---|
| Carbon | 95 | 165 |
| Nitrogen | 95 | 25 |
| Nickel | 290 | 300 |
| Oxygen | 1,090 | 315 |
| Fluorine | 510 | 50 |

It will be seen that the oxygen and fluorine contents were considerably reduced by the process of this invention.

EXAMPLE II

Yttrium sponge, 1000 grams, was dissolved in 1515 grams of anhydrous magnesium chloride at 900° C. in a tantalum-lined titanium crucible and stirred for 30 minutes while an argon atmosphere of 5 p.s.i. was maintained in the container. A magnesium-yttrium alloy containing 2% by weight of yttrium was obtained. The mixture obtained was then heated in a vacuum at 975° C. for 48 hours, whereby the yttrium chloride and the magnesium formed were evaporated and condensed in a tantalum crucible. To the condensate there were then added 700 grams of calcium, and this mixture was heated to 975° C. in an argon atmosphere of 5 p.s.i. After the reaction, the alloy was decanted from the salt.

1242 grams of an yttrium-magnesium-calcium alloy containing 29% by weight of magnesium were obtained. This alloy was then heated to 950° C. in a vacuum for 24 hours, whereby the magnesium and calcium were volatilized and 882 grams of yttrium sponge were obtained. This corresponded to an yttrium yield of 88%.

The sponge was arc-melted into a button and analyzed. The results are compiled in Table II.

Table II

| Impurity | Crude Yttrium, p.p.m. | Yttrium Product, p.p.m. |
|---|---|---|
| Oxygen | 3,070 | 2,485 |
| Carbon | 275 | 155 |
| Nitrogen | 145 | 340 |
| Fluorine | 1,110 | 35 |
| Nickel | 115 | 40 |
| Iron | 185 | 85 |
| Chromium | 50 | 5 |
| Titanium | 1,600 | 235 |

Decontamination from fluorine and the contaminating metals was satisfactory, but that from oxygen was insufficient.

EXAMPLE III

The procedure of Example II was repeated with a different type of yttrium sponge as the raw material but identical quantities and conditions. However, in this instance the reaction mass of the dissolution-chlorination step was vacuum-heated for 45 hours only for the volatilization of the yttrium chloride and the magnesium. Another distinction of this procedure from that of Example II was that the yttrium-magnesium-calcium alloy, obtained by subsequent chlorination, distillation and reduction of the condensate, was treated with an additional 750 grams of anhydrous yttrium chloride at 975° C. for a second purification of the metal. In this example the yttrium yield was 85%.

The compositions of the crude yttrium metal and the purified metal are compared in Table III.

Table III

| Impurity | Crude Yttrium, p.p.m. | Yttrium Product, p.p.m. |
|---|---|---|
| Oxygen | 1,065 | 570 |
| Carbon | 105 | 90 |
| Nitrogen | 120 | 75 |
| Fluorine | 985 | 10 |
| Nickel | 290 | 105 |
| Iron | 115 | 60 |
| Chromium | 175 | 20 |
| Titanium | 2,585 | 300 |

In this instance decontamination from oxygen was better than in Example II, while all the other impurities were reduced about equally well.

It will be understood that the invention is not to be limited to the details given herein but that it may be modified within the scope of the appended claims.

What is claimed is:
1. A process of removing impurities from crude yttrium metal, comprising dissolving said yttrium metal in molten magnesium chloride, whereby yttrium chloride and magnesium are formed; providing in the molten mass obtained a content of crude yttrium metal to be purified, whereby impurities of said yttrium metal are extracted into the yttrium chloride formed and purified yttrium is obtained and alloyed with said magnesium; separating the yttrium chloride from the yttrium-magnesium alloy; and heating the yttrium-magnesium alloy, whereby magnesium is volatilized and purified yttrium is obtained.

2. The process of claim 1 wherein the magnesium chloride is anhydrous.

3. The process of claim 2 wherein chlorination of the yttrium is carried out in an inert atmosphere at superatmospheric pressure and the temperature is within the range of from 950 to 1000° C.

4. The process of claim 3 wherein the inert atmosphere is argon.

5. The process of claim 3 wherein the content of crude yttrium is provided by using magnesium chloride in a quantity less than the stoichiometric amount required for chlorination of all of the yttrium.

6. A process of removing impurities from crude yttrium metal, comprising dissolving said yttrium metal in a stoichiometric amount of anhydrous magnesium chloride at a temperature of between 950 and 1000° C. in an inert atmosphere at superatmospheric pressure, whereby yttrium chloride and magnesium are formed and the impurities are extracted into said yttrium chloride formed; subjecting the molten mass to vacuum distillation, whereby yttrium chloride and magnesium metal are volatilized, while the impurities remain in a residue; condensing said yttrium chloride and magnesium vapors; melting said condensate formed in an inert atmosphere; adding calcium metal to the molten condensate, whereby yttrium chloride is reduced and an yttrium-magnesium-calcium alloy and calcium chloride are formed; separating the yttrium-magnesium-calcium alloy from the calcium chloride; and subjecting said alloy to vacuum distillation for the removal of magnesium and calcium.

7. The process of claim 6 wherein calcium is added in less than stoichiometric quantity so that some unreduced yttrium chloride remains and extracts impurities from the yttrium metal formed and wherein the molten impurities-containing calcium chloride-yttrium chloride is separated from the yttrium-magnesium alloy formed.

8. A process of producing purified yttrium metal from impurities-containing molten yttrium chloride, comprising adding calcium in less than stoichiometric quantity to said yttrium chloride, while the mass is in contact with an inert atmosphere under superatmospheric pressure, whereby a portion of the yttrium chloride is reduced to the metal and the remaining portion of the yttrium chloride extracts impurities from the yttrium metal formed; and separating the impurities-containing yttrium chloride-calcium chloride mixture from the yttrium metal formed.

9. A process of removing fluorine- and oxygen-containing contaminants from yttrium metal, comprising equilibrating said yttrium metal with molten yttrium chloride at 950–1000° C. in an inert atmosphere of superatmospheric pressure, whereby said impurities are taken up by the yttrium chloride; and separating the yttrium chloride from the purified yttrium metal.

References Cited in the file of this patent

Atomic Energy Commission Document IS–193, December 1960, pp. 19–22.

Hampel: Rare Metals Handbook, second ed., Reinhold Publ. Corp., 1961, p. 660.